United States Patent [19]
Loh

[11] 3,801,871
[45] Apr. 2, 1974

[54] GFI CIRCUIT HAVING TUNED CIRCUIT FAULT DETECTOR
[75] Inventor: Huai-Kuang Loh, Tantallon Hills, Md.
[73] Assignee: AMF Incorporated, White Plains, N.Y.
[22] Filed: Apr. 23, 1973
[21] Appl. No.: 353,791

[52] U.S. Cl. ............... 317/18 D, 317/27 R, 317/53
[51] Int. Cl. ............................................. H02h 1/02
[58] Field of Search .................. 317/18 D, 53, 27 R

[56] References Cited
UNITED STATES PATENTS
3,761,774   9/1973   Laughinghouse et al. ........ 317/18 D
3,713,003   1/1973   Benham ........................... 317/18 D Primary Examiner—William M. Shoop, Jr.
Assistant Examiner—Patrick Salce
Attorney, Agent, or Firm—George W. Price; John H. Gallagher

[57] ABSTRACT

A ground fault current interrupter circuit for detecting a ground fault on a hot conductor and on a grounded neutral conductor of a power line. A transformer has two balanced multi-turn windings respectively series connected in the two conductors and has a third multi-turn winding excited by an oscillator whose frequency is much higher than the frequency of the power line source. The third winding is connected in a tuned circuit whose change of output signal is sensed to control circuit breaker means in the power line conductors. In the absence of a fault on either line, the two windings in the conductors reflect a balanced, substantially infinite impedance in parallel with the tuned circuit and the signal therein is maximum. A fault on one of the conductors reflects back as a lower impedance to the tuned circuit and the signal therein is reduced in magnitude. The change in signal level is sensed to actuate a circuit breaker. Means are provided to assure that the oscillator frequency and resonant frequency of the tuned circuit are substantially equal, thereby to cancel out the effect of reactive loading on the power line.

15 Claims, 2 Drawing Figures

GFI CIRCUIT HAVING TUNED CIRCUIT FAULT DETECTOR

BACKGROUND OF THE INVENTION

This invention relates to a ground fault interrupter (GFI) circuit for sensing an undesired ground connection or other hazardous conditions in current carrying conductors of an electrical distribution system, and upon sensing such a ground connection for interrupting current flow from the source of current.

In recent years many proposals have been offered for devices intended to provide protection for humans and property which inadvertently come into contact with a current conducting line of an electrical supply system, or which unexpectedly are subject to high current flow and thus shock and damage because of some fault occurring in the supply system. Many of these devices employ a differential transformer whose primary windings are the current carrying lines of the supply system and whose secondary winding is connected to fault detection circuitry. In the absence of a fault or hazard on the lines of the system the current flowing in one primary winding toward the load is equal to the current returning back to the source through the other primary winding. The equal currents in the primary windings of the transformer induce equal and opposing magnetic flux fields in the transformer core and no signal is coupled to the secondary winding. When a fault occurs in the system, such as a human becoming inadvertently connected from a current carrying line to ground, currents in the primary windings of the transformer no longer are equal and a resultant flux is established in the transformer core. This flux induces a signal in the secondary winding which is sensed by a sensing circuit and which in turn initiates operation of a circuit breaker to open the lines of the system.

SUMMARY OF THE PRESENT INVENTION

The ground fault interrupter circuit of the present invention comprises a transformer having two multi-turn primary windings respectively connected in series in the two line conductors and a multi-turn secondary winding. However, in concept and theory of operation the transformer in the present invention differs from those of the prior art discussed above because the operation of the transformer of the present invention is not based on the concept of different currents flowing in the two primary windings to produce a flux in the transformer core which induces a voltage, or a change of voltage, in the secondary winding. In the present invention the secondary winding is part of a high Q tuned circuit which is coupled to a voltage controlled oscillator. Under proper operating conditions and in the absence of a fault to ground on either conductor, the impedances of the two primary windings reflect back through the transformer to the tuned circuit as substantially infinite impedances, thus having substantially no effect on the tuning of the circuit. In the presence of a fault connection to ground on either or both of the line conductors, the conductors no longer appear as infinite impedances but reflect back to the tuned circuit as a relatively small parallel connected impedance, thereby lowering the Q of the tuned circuit and causing the magnitude of the oscillator signal therein to be lower. The change in magnitude of the oscillator signal in the tuned circuit is sensed and when the magnitude changes by a predetermined amount, circuit breaker or other current interrupting means in the line conductors are actuated to disconnect the source from the load. Safety requirements in the industry specify that a class A type GFI circuit should not operate in response to a capacitive fault to ground of less than 0.015 microfarads. To present undesired operation in the presence of a predominantly capacitive fault, which would cause a shift in the resonant frequency of the tuned circuit, the oscillator is included in a phase locked loop circuit which compares the phase of the oscillator signal with the phase of the signal in the tuned circuit. As the resonant frequency of the tuned circuit tends to change due to the reflection thereto of a capacitive load, the phase of the signal in the circuit will tend to change. A phase comparator in the phase locked loop compares the phases of the oscillator signal and the signal in the tuned circuit and produces in response thereto a frequency tracking signal which is coupled back to the voltage control oscillator to change its frequency to coincide with the changed resonant frequency of the tuned circuit. In this manner it is virtually assured that only a resistive fault to ground exceeding a predetermined magnitude will initiate operation of the GFI circuit.

In another embodiment of the invention, a phase comparator means compares the signals from the tuned circuit and from a fixed frequency oscillator and in response thereto controls the capacitance value of a negative capacitance circuit that is coupled to the tuned circuit. Within given limits the negative capacitance circuit is caused to present a negative value of capacitance which cancels the capacitance value coupled through the transformer to the tuned circuit from one of the conductors of the power line. The resonant frequency of the tuned circuit therefore does not change and the magnitude of the signal across it does not change. In this manner the sensing circuit will not sense a capacitive fault on a line conductor that is below a given acceptable magnitude.

DETAILED DESCRIPTION OF THE INVENTION

Figure 1:
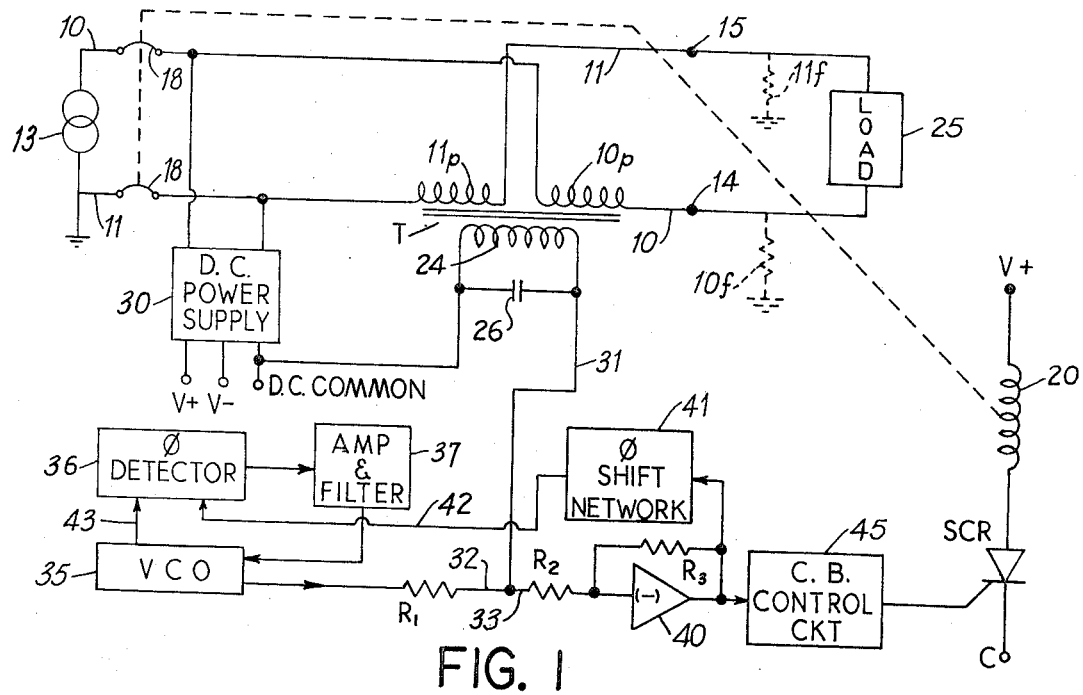
FIG. 1 is a simplified drawing, partially in schematic and partially in block form, illustrating one embodiment of the present invention.

In FIG. 1, conductors 10 and 11 are respectively the "hot" and neutral conductors of a power line and connect a grounded source 13 of 60 Hz current, for example, to respecive load terminals 14 and 15. A manually settable circuit breaker 18 of conventional design has its normally closed contacts in the line conductor. These contacts 18 are opened to interrupt current flow upon actuation of circuit breaker coil 20. A transformer T includes multi-turn primary winding 10p and 11p which are respectively series connected in conductors 10 and 11. Primary windings 10p and 11p each may have 20 turns, for example. Transformer T also includes a multi-turn secondary winding 24 which also may have 20 turns, thereby providing a one-to-one turns ratio for the transformer.

Primary windings 10p and 11p are wound on the transformer core in balanced or bucking relationship so that when they both carry equal 60 Hz current they produce equal and opposing flux fields in the core. Consequently, under normal no-fault conditions, no 60 Hz flux is in the core, and no 60 Hz signal is induced in secondary winding 24.

A load 25 may be connected to load terminals 14 and 15 of the respective line conductors.

A capacitor 26 is connected in parallel with secondary winding 24 to provide a tuned circuit having a resonant frequency $f_o$ which may range from 5 to 10 kiloHertz, for example. One side of the tuned circuit is connected through leads 31, 32 and resistor $R_1$ to an output terminal of voltage controlled oscillator 35 which has a free running frequency $f_o$. The other side of the tuned circuit is connected to the common terminal of the D.C. power supply 30 which is connected across line conductors 10 and 11.

Voltage controlled oscillator 35 is included in a phase locked loop that includes phase detector 36 and amplifier and low pass filter circuit 37. Various arrangements of phase locked loop circuitry may be employed in the present invention. As an example, I have used an integrated circuit device sold by Signetics Corporation, Sunnyvale, Calif. under the designation SE/NE 565. This integrated circuit and the phase locked loop is described in the manufacturer's bulletin D41-1 LIN-023-110 10M, dated November, 1970.

The tuned circuit comprised of secondary winding 24 and capacitor 26 also is coupled by way of leads 31 and 33 to a high gain operational amplifier 40 having an input resistor $R_2$ and a feedback resistor $R_3$. Operational amplifier 40 functions as a sensing circuit to sense the change in magnitude of the oscillatory signal in the tuned circuit.

The output of operational amplifier 40 is connected to phase shift network 41 which introduces a 90° phase shift to its input signal, which corresponds to the output signal of the tuned circuit. This phase shift is introduced so that the signals on lines 42 and 43 are in quadrature relationship, this being a requirement for the input signals for the type of phase detector 36 included in the phase locked loop.

The output of operational amplifier 40 also is coupled as the input to circuit breaker control circuit 45 which may function in the nature of a bi-stable circuit to change from one operating condition to another in response to a change in response of a given magnitude in the output signal from the sensing circuit of operational amplifier 40. The output of circuit breaker control circuit 45 is coupled to the gate electrode of a silicon controlled rectifier device. In normal operation in the absence of a fault 10f or 11f on either of the conductors 10 or 11, circuit breaker control circuit 45 produces no output, or an output of sufficiently low magnitude so as to maintain the SCR device in a nonconducting condition. In the absence of current flow through the SCR device no current flows through circuit breaker coil 20 and contacts 18 remain closed to connect source 13 to load terminals 14 and 15. When circuit breaker control circuit 45 is caused to change to its second condition in response to the sensing of a fault condition by sensing circuit 40, its output signal will provide sufficient bias voltage to the gate electrode of the SCR device to cause the device to conduct, thus energizing circuit breaker coil 20 and causing contacts 18 to open and disconnect source 13 from load terminals 14 and 15.

In the design and construction of the transformer T, the two primary windings 10p and 11p are multi-turn windings having equal numbers of turns, and secondary winding 24 is a multi-turn winding with the same number of turns so as to provide a one-to-one turns ratio.

The turns ratio from windings 10p or 11p to winding 24 desirably is unity, or some other small value not greater than 2, for example, in order to assure that an objectionable fault on one of the conductors 10 or 11 will be reflected to the tuned circuit as a coupled impedance which is low enough, relative to the nominal impedance of the tuned circuit, to produce a significant change in Q of the tuned circuit. This assures a readily detectable change in magnitude of the signal across the tuned circuit. Because the magnitude of the impedance reflected from a winding 10p or 11p to winding 24 is a function of the square of the turns ratio, this ratio obviously should be made small so that a ground fault of less than a value of 25 kilo ohms on hot conductor 10 will be sure to produce a detectable change in the signal across the tuned circuit. In the circuit of FIG. 1, the nominal impedance of the tuned circuit may be 8 to 10 kilo ohms, for example.

For high sensitivity of detection it is desired that the tuned circuit comprised of winding 24 and capacitor 26 have a relatively high Q value, of at least 25 to 50 for example. This requires that the core material of transformer T have a relatively low loss and relatively high permeability at the frequency of oscillator 35. Examples of core materials that may be used are ferrite materials designated types 3E3 and 3E2A, available from Ferroxcube Corporation, Saugerties, N.Y.

In the operation of the GFI circuit of this invention, assuming first that no fault is present on either of the conductors 10 or 11, and assuming that a load 25 is connected to the conductors, equal 60 Hz currents from source 13 will flow in conductors 10 and 11 to and from load 25. No 60 Hz current will be coupled to secondary winding 24 because of the balanced relationship of primary windings 10p and 11p.

The free running frequency $f_o$ of oscillator 35 is the resonant frequency $f_o$ of the tuned circuit comprised of winding 24 and capacitor 26. With the balanced condition presented by the identical balanced primary windings 10p and 11p, the conductors 10 and 11 will appear to the tuned circuits as substantially infinite impedances and will have substantially no effect on the tuned circuit. Similarly, no oscillator current will flow in conductors 10 and 11. Therefore, the signal in the tuned circuit will be in phase with the output signal of oscillator 35, and the magnitude of the signal in the tuned circuit will be of optimum value. The output across the tuned circuit is coupled by way of lead 31 to the sensing circuit comprised of operational amplifier 40, which is illustrated as an inverting high gain amplifier. The output of sensing circuit 40 is coupled through phase shifter network 41 wherein the signal experiences a 90° phase shift. The phase shifted signal is coupled on lead 42 to the second input of phase detector 36 in a quadrature relationship with the oscillator output signal on lead 43. Because the oscillator output signal and the signal in the tuned circuit bear a proper and desired phase relationship in the operating condition now assumed, the output of phase detector 36 will be zero and no frequency tracking signal will be coupled from amplifier and low pass filter circuit 37 back to voltage controlled oscillator 35. Oscillator 35 therefore continues to oscillate at the resonant frequency $f_o$ of the tuned circuit.

The signal sensed by sensing 40 also is coupled to circuit breaker control circuit 45 which operates in response thereto to provide no output signal, or a very low output signal, to the gate electrode of the SCR device so as to maintain the device in a non-conducting state. Circuit breaker coil 20 therefore remains unenergized to keep circuit breaker contacts 18 in their normally closed position to connect source 13 to load terminals 14 and 15.

Assuming now that a fault 10f or 11f exists on one of the line conductors 10 and/or 11, the conductors no longer present a balanced and thus infinite load to the tuned circuit. Rather, assuming that neutral conductor 11 is grounded so as to present a load impedance equal to or less than 4 ohms, for example, this impedance is transformed back to the tuned circuit as a parallel impedance, thereby significantly reducing the resultant impedance of the tuned circuit and causing the magnitude of the oscillatory signal in the tuned circuit to significantly decrease. Based on the assumption that the fault 11f to ground on neutral conductor 11 is substantially wholly a resistive fault, the impedance reflected back to the tuned circuit will be substantially wholly resistive so that the resonant frequency $f_o$ of the tuned circuit remains substantially unchanged.

The change in magnitude of the oscillatory signal in the tuned circuit is detected by sensing circuit 40. The input signal to circuit breaker control circuit 45 now changes sufficiently to cause the circuit to abruptly change to its second operating condition in which it provides a biasing voltage of sufficient magnitude to the gate electrode of the SCR device to cause the device to conduct. Conduction of the SCR device energizes circuit breaker coil 20 and opens contacts 18 to disconnect source 13 from load terminals 14 and 15.

The circuit of FIG. 1 is so constructed and parameter values so chosen that the circuit operation just described is substantially the same in the presence of a ground fault 10f on hot conductor 10 which has a resistive value less than a predetermined magnitude such as 25 kilo ohms. However, if the resistive value of faults 10f or 11f is in excess of the predetermined value of 25 kilo ohms, the parameter values of the circuit of FIG. 1 are such that the change in Q of the tuned circuit will not be substantial and the change in the output of sensing circuit 40 will not be of sufficient magnitude to change circuit breaker control circuit 45 to its second operating condition. Accordingly, circuit breaker coil 20 will not be energized when the resistance value of a fault 10f or 11f exceed the predetermined value of 25 kilo ohms. This value currently is the value set as an industry standard.

Assuming now that a fault on one of the line conductors 10 and 11 has a resistive value greater than the values discussed above for the respective conductors, but does have a capacitance value less than 0.015 microfarads, the circuit operation is as follows. The capacitive load on a line conductor is reflected through transformer T into parallel circuit arrangement with the tuned circuit comprised of winding 24 and capacitor 26. The reactance value of the tuned circuit now changes so that the resonant frequency of the circuit changes to a new value $f_o'$. Because the frequency of oscillator 35 initially is at $f_o$ rather than $f_o'$, the tuned circuit will be operating off its resonant frequency and the magnitude of the signal in the tuned circuit would tend to be reduced. Also, the phase of the signal in the tuned circuit changes with respect to the output of oscillator 35. In this operating condition the signals on leads 42 and 43 to the input of phase detector 36 no longer bear a desired phase relationship so that an output signal is produced from phase detectors 36. This signal is amplified and filtered in circuit 37 and is coupled back to voltage controlled oscillator 35 so as to change its frequency of oscillation to a new frequency of $f_o'$, thereby bringing the exciting voltage of the tuned circuit to the new resonant frequency $f_o'$ of the tuned circuit and maintaining the magnitude of the signal in the tuned circuit at its nominal value for a non-fault condition. In this mode of operation, sensing circuit 40 will be unable to sense the capacitive fault that is assumed now to exist.

An attractive feature of the circuit of this invention is that it is capable of sensing an undesired ground fault on either the hot conductor 10 or the neutral conductor 11. This is accomplished with the use of but one transformer and represents a decided advantage over many prior art circuits which require the use of two transformers for sensing the respective faults on the two conductors. Furthermore, a load 25 does not have to be connected to load terminals 14 and 15 in order for the GFI circuit of this invention to be operative. This feature eliminates the need for building test circuitry as part of a basic GFI circuit.

The above discussion assumed that the circuit breaker device was a commonly employed type which is manually settable and resettable to the closed condition. It is to be understood that, if desired, the current interrupting means may be a holding relay which in the absence of a fault condition has its contacts held in the closed positions to provide continuity of current flow on conductors 10 and 11. In the presence of an undesired fault on either conductors the holding current for the relay would be interrupted to allow its contacts to open. In an arrangement such as this, circuit breaker control circuit 45 would operate oppositely in the manner previously discussed.

Figure 2:
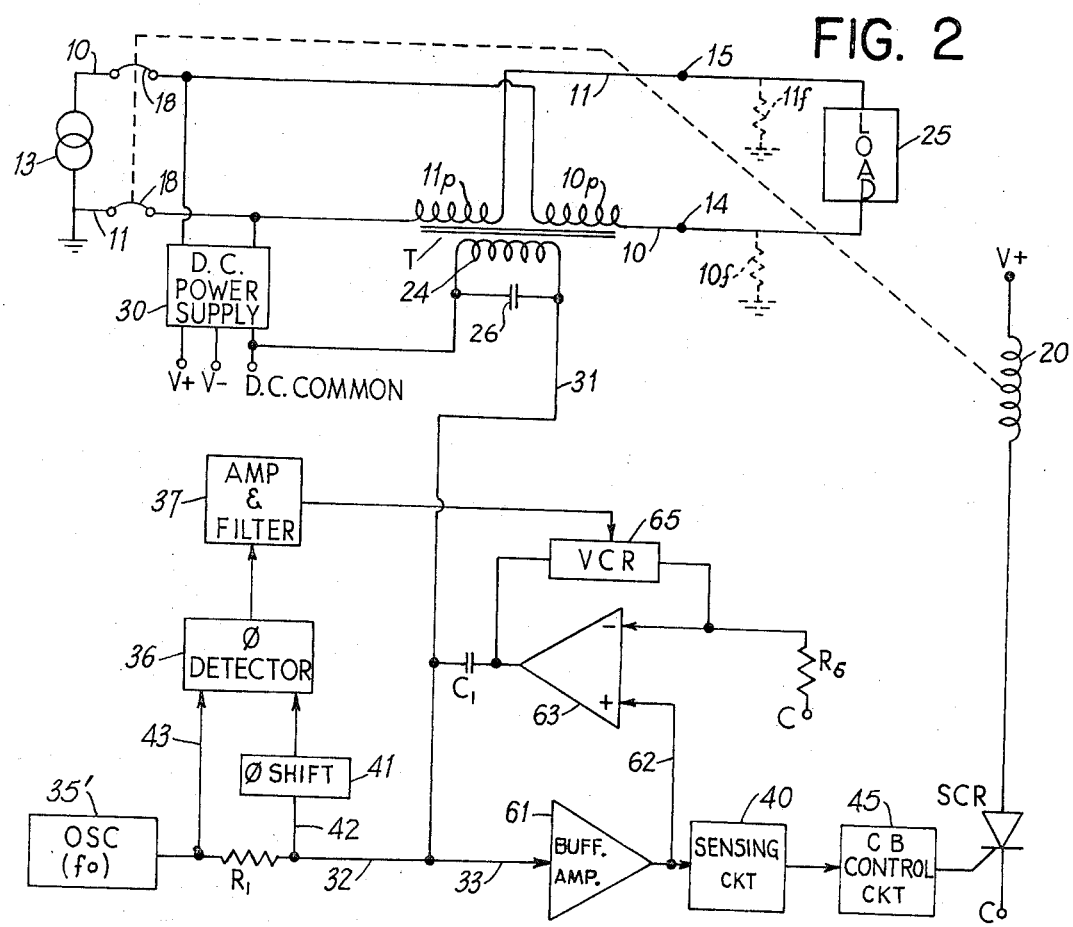
FIG. 2 is a simplified illustration, partially in schematic form and partially in block form, illustrating an alternative embodiment of the present invention.

Another GFI circuit operating in accordance with the principles of this invention is illustrated in simplified form in FIG. 2. This circuit operates similarly to the circuit of FIG. 1 in response to resistive ground faults 10f and 11f, but operates slightly differently in response to a ground fault which is predominantly capacitive with a value less than or equal to the above-mentioned value of 0.015 microfarads. Accordingly, the construction and operation of the circuit of FIG. 2 will be discussed in detail only with respect to a capacitive ground fault having the value discussed above.

In FIG. 2, the source 13, line conductors 10 and 11, circuit breaker 18, transformer T, load terminals 14 and 15, load 25, D.C. power supply 30, circuit breaker coil 20, and the SCR device and its control circuit 45, are substantially the same as described in connection of FIG. 1. Furthermore, the tuned circuit comprised of winding 24 and capacitor 26 is as illustrated in FIG. 1 and has a nominal resonant frequency $f_o$.

In this embodiment of the invention, oscillator 35' is not a voltage controlled oscillator as in FIG. 1, but is a fixed frequency oscillator which produces an output signal at frequency $f_o$. The output signal of oscillator 35' is coupled through resistor $R_1$, leads 32 and 31 to the tuned circuit comprised of winding 24 and capacitor 26. The oscillatory signal in the tuned circuit is coupled by way of leads 31 and 33 to buffer amplifier 61 and then to sensing circuit 40 which may be similar to the like numbered circuit in FIG. 1.

Phase detector 36 receives input signals from lines 42 and 43 which, respectively, are the oscillatory signal in the tuned circuit and the output signal of oscillator 35'. Phase shift network 41 establishes a desired phase relationship between the input signals, as discussed in connection with the phase shift network of FIG. 1. Amplifier and low pass filter circuit 37 receives the output from phase detector 36 and produces a corresponding output which is coupled to voltage controlled resistor (VCR) 65.

The circuit loop comprised of lead 33, buffer amplifier 61, lead 62, operational amplifier 63 with its feedback resistor VCR 65, and capacitor $C_1$ constitute an active circuit which presents a negative value of capacitance to the tuned circuit comprised of winding 24 and capacitor 26. The value of negative capacitance presented by the active circuit loop is a function of the gain of operational amplifier 63, and thus is a function of the resistance value of VCR 65. The voltage controlled resistor may be a FET transistor such as types VCR2N or VCR3P, obtainable from Siliconix, Inc., Santa Clara, Calif. The gain of operational amplifier 63, and thus the magnitude of the negative capacitance presented by the active loop increases as the resistance value of VCR 65 increases.

The operation of the circuit of FIG. 2 now will be discussed to explain how it, in effect, ignores a substantially wholly capacitive fault approximately equal to or less than 0.015 microfarads. The tuned circuit on the secondary of transformer T is excited by the output signal at frequency $f_o$ from oscillator 35'. In the absence of any loading on the tuned circuit the signal in the circuit will be in phase with the exciting signal from oscillator 35'. However, when a substantially wholly capacitive ground fault $10f$ or $11f$ is coupled through transformer T into parallel circuit arrangement with winding 24 and capacitor 26, the resonant frequency of the tuned circuit tends to change, thereby producing a phase displacement between the signal in the tuned circuit and the output signal from oscillator 35'. These two signals are coupled as the inputs to phase detector 36, and because the input signals now do not bear a desired proper phase relationship, phase detector 36 produces an error or tracking signal which is amplified and filtered in circuit 37 and then coupled as the control signal to VCR 65. In response to this tracking signal input to VCR 65, its resistance value changes in such a manner as to vary the gain of the active loop so that the negative capacitance presented by the active loop to the tuned circuit is substantially equal and opposite to the capacitance value coupled through transformer T from one or both of the lines 10 and/or 11. The two coupled capacitance values therefore tend to cancel and leave the reactance value of the tuned circuit substantially at its nominal value. Therefore, the tuned circuit is resonant approximately at the frequency $f_o$ and the oscillatory signal in the tuned circuit bears approximately the desired phase relationship to the output signal of oscillator 35'. With this phase relationship between the two input signals to phase detector 36, its output will control VCR 65 in such a manner as to maintain the gain of the active loop at the required value to present a value of negative capacitance which substantially cancels the coupled fault capacitance. A stabilized tracking condition is thus established and the magnitude of the signal in the tuned circuit does not substantially change from its no-fault magnitude. Consequently, the output of sensing circuit 40 will not change sufficiently to cause circuit breaker control circuit 45 to change to its second operating condition. Circuit breaker coil 20 therefore remains unenergized and contacts 18 remain closed.

When the value of the fault capacitance exceeds approximately 0.015 microfarads, the parameters of the circuit are such that the active loop including operational amplifier 63 no longer can produce a value of negative capacitance which will cancel the coupled fault capacitance. The tuned circuit now will change its resonant frequency and the magnitude of its output signal will change sufficiently to cause circuit breaker control circuit 45 to operate and fire the SCR device. Coil 20 is energized and opens contacts 18 to disconnect source 13.

It should be noted that operation of this circuit is not dependent upon which of the conductors 10 or 11 is intentionally grounded. Therefore, an incorrectly connected house wiring system wherein the hot and neutral conductors were incorrectly cross connected by an electrician, for example, would have no effect on the operation of the circuit.

In view of the above discussion it may be seen that the GFI circuits of FIGS. 1 and 2, in effect, keep themselves tuned to the power lines they are monitoring by tuning out unbalanced capacitive line loads below a given value. This avoids faulty operation of the GFI circuits and enhances their practical usefulness.

What is claimed is:

1. In an electrical power distribution system comprising at least two current carrying conductors for connecting a source of current to load terminals, one of said conductors being grounded at said source and the other conductor being above ground potential, means for detecting a fault connection to ground on at least one of said conductors and in response thereto interrupting the current flow path from said source, comprising
   current interrupter means in at least one of said conductors and operable between a current conducting and a current interrupting condition,
   a tuned circuit inductively coupled to said conductors,
   an oscillator coupled to said tuned circuit for exciting said tuned circuit with an oscillator signal having a frequency higher than the frequency of the current on said conductors so that the tuned circuit is not resonant at the frequency of said source of current,
   said tuned circuit being constructed and arranged to have therein a signal of a first characteristic in the absence of a fault to ground on either of said conductors and to have a signal therein of different characteristic in the presence of a fault to ground below a given resistive magnitude on either one of said conductors,
   means coupled to said tuned circuit for operating said current interrupter means to its interrupting condition when a characteristic of the signal in the tuned circuit changes by a given value from said first characteristic, and means responsive to the signal in said tuned circuit for causing the resonant frequency of the tuned circuit and the frequency of the oscillator output signal to be substantially equal to each other.

2. The combination claimed in claim 1 wherein the means responsive to the signal in said tuned circuit includes means for comparing the signal in said tuned circuit and the output signal of said oscillator and for producing a tracking signal which has a value which is a function of the phase relationship between the compared signals, and means responsive to the tracking signal for causing the frequency of the oscillator output signal and the resonant frequency of the tuned circuit to be substantially equal to each other.

3. The circuit claimed in claim 1 wherein said oscillator is a variable frequency oscillator and wherein the means responsive to the signal in said tuned circuit comprises a phase locked loop for comparing the signal in the tuned circuit and the oscillator output signal and for producing a tracking signal having a value which is a function of the relative phases of said compared signals, and means for coupling said tracking signal to said oscillator to make the frequency of said oscillator output signal substantially equal to the resonant frequency of said tuned circuit.

4. The circuit claimed in claim 1 wherein the means responsive to the signal in said tuned circuit comprises an active circuit loop which presents a negative value of capacitance to said tuned circuit, means in said active circuit loop responsive to a tracking signal for changing the value of said negative capacitance as a function of the value of the tracking signal, said means responsive to the signal in the tuned circuit further including means for comparing said oscillator output signal and the signal in said tuned circuit and for producing in response thereto said tracking signal whose value is a function of the relative phases of said compared signals, said active circuit loop responding to said tracking signal to produce a value of negative capacitance which makes the resonant frequency of the tuned circuit substantially equal to the frequency of said oscillator.

5. The combination claimed in claim 1 wherein said tuned circuit is inductively coupled to said conductors by a transformer which has first and second multi-turn windings respectively connected in said two conductors and has a third multi-turn winding which is included in said turned circuit, said windings being wound on a core of magnetic material that exhibits relatively low reluctance and relative high permeability at the frequency of said oscillator.

6. The combination claimed in claim 5 wherein the ratio of the number of turns between said first or second windings and said third winding does not exceed approximately two.

7. The combination claimed in claim 6 wherein the ratio is one.

8. In an electrical power distribution system comprising at least two current carrying conductors for connecting a source of current to load terminals, one of said conductors being grounded at said source and the other conductor being above ground potential, means for detecting a fault connection to ground on at least one of said conductors and in response thereto interrupting the current flow path from said source, comprising current interrupter means in at least one of said conductors and operable between a current conducting and a current interrupting condition, first and second multi-turn transformer windings connected in series relationship, respectively, in said two conductors, said windings being wound in balanced relationship on the transformer, a third multi-turn transformer winding inductively coupled to said first and second windings, circuit means connected to said third winding for providing a tuned circuit having a nominal resonant frequency, an oscillator coupled to said tuned circuit for exciting the tuned circuit with an oscillator output signal having a frequency higher than the frequency of current on said conductors so that the tuned circuit is not resonant at the frequency of said source of current, said tuned circuit being constructed and arranged to have therein a signal of a first magnitude in the absence of a fault to ground on either of said conductors and to have a signal therein which is different in magnitude when a fault to ground below a given resistive value is present on either one of said conductors, means coupled to said tuned circuit for operating said current interrupter means to its interrupting condition when the magnitude of the signal in said tuned circuit changes by a given value from said first magnitude, and means responsive to the output signal of said oscillator and to the signal in the tuned circuit for causing the resonant frequency of the tuned circuit and the frequency of the oscillator output signal to be substantially equal to each other.

9. The combination claimed in claim 8 wherein said first and second windings are wound in balanced relationship.

10. The combination claimed in claim 9 wherein the turns ratio between a first or second winding and the third winding does not exceed two.

11. The combination claimed in claim 8 wherein said windings are wound on a core of magnetic material that has a low reluctance and high permeability at the frequency of said oscillator.

12. The combination claimed in claim 8 wherein said means responsive to the output signal of the oscillator and to the signal in the tuned circuit includes means for comparing the phases to the two signals and for producing a tracking signal whose value is a function of the relative phases of the compared signals.

13. The combination claimed in claim 12 wherein the oscillator is a variable frequency oscillator and wherein the means responsive to the output signal of the oscillator and to the signal in the tuned circuit further includes means for coupling the tracking signal to said oscillator to change the frequency of the oscillator to maintain a desired phase relationship between said compared signals.

14. The combination claimed in claim 12 wherein the means responsive to the output signal of the oscillator and to the signal in the tuned circuit further includes
   an active circuit loop which presents a negative value of capacitance to said tuned circuit,
   means in said active circuit loop responsive to said tracking signal for changing the value of said negative capacitance as a function of the value of the tracking signal thereby to maintain a desired phase relationship between said compared signals.

15. In an electrical power distribution system comprising at least two current carrying conductors for connecting a source of current to load terminals, one of said conductors being grounded at said source and the other conductor being above ground potential, means for detecting a fault connection to ground on at least one of said conductors and in response thereto interrupting the current flow path from said source, comprising
   current interrupter means in at least one of said conductors and operable between a current conducting and a current interrupting condition,
   first and second multi-turn transformer windings connected in series relationship, respectively, in said two conductors, said windings being wound in balanced relationship on the transformer,
   a third multi-turn transformer winding inductively coupled to said first and second windings,
   circuit means connected with said third winding for providing a tuned circuit having a resonant frequency $f_o$,
   a variable frequency oscillator having a free running frequency $f_o$,
   means for coupling said oscillator to said tuned circuit to excite said tuned circuit with the output signal of the oscillator,
   means for comparing the phase of the output signal of the oscillator with the phase of the signal in said tuned circuit and for producing a tracking signal having a characteristic which is a function of the phase relationship between said compared signals,
   means for coupling said tracking signal to said variable frequency oscillator for changing the frequency of oscillation of the oscillator to maintain a desired relationship between the two compared signals,
   means for sensing the magnitude of the signal in said tuned circuit and for producing a sensing signal whose magnitude is a function of the signal in said tuned circuit, and
   means operable in response to said sensing signal for operating said current interrupting means when said sensing signal changes in a predetermined manner.

* * * * *